July 27, 1943.  C. W. McKINLEY  2,325,415
BLINKER GAUGE
Filed June 20, 1942  2 Sheets-Sheet 1

Inventor
Charles W. McKinley
By Blackmore, Spencer & Hunt
Attorneys

July 27, 1943.    C. W. McKINLEY    2,325,415
BLINKER GAUGE
Filed June 20, 1942    2 Sheets-Sheet 2
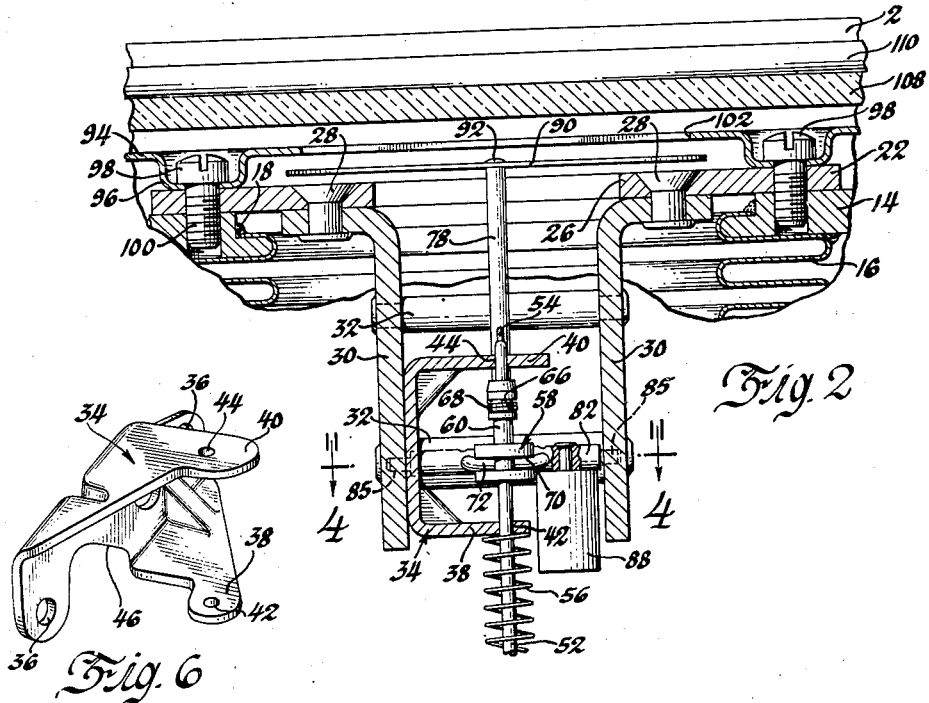
Fig. 2
Fig. 6
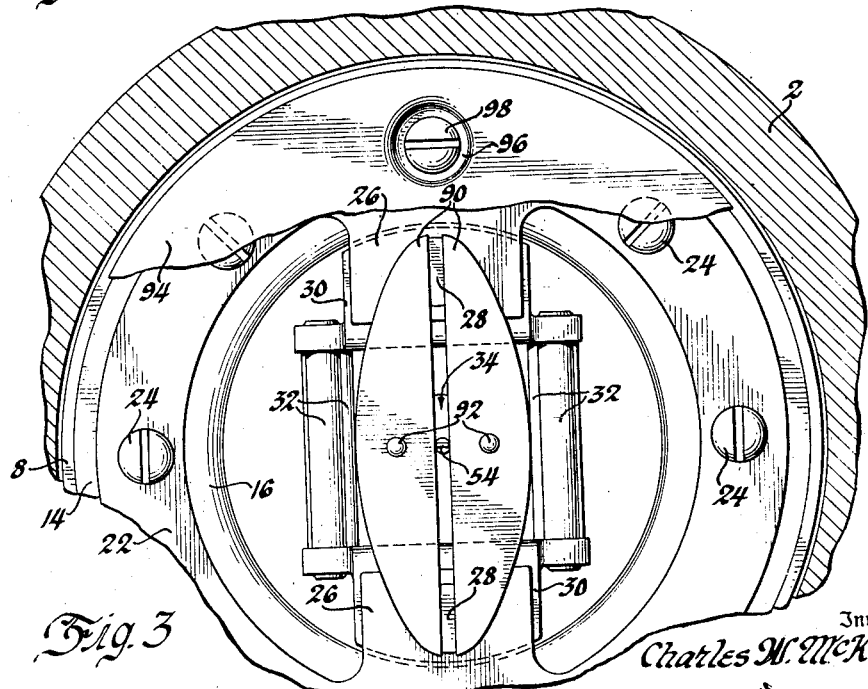
Fig. 3
Inventor
Charles W. McKinley
By Blackmore, Spencer & Flint
Attorneys Patented July 27, 1943

2,325,415

UNITED STATES PATENT OFFICE 2,325,415

BLINKER GAUGE

Charles W. McKinley, Flint, Mich., assignor to General Motors Corporation, Detroit, Mich., a corporation of Delaware Application June 20, 1942, Serial No. 447,879

20 Claims. (Cl. 116—117)

This invention relates to a blinker type gauge and is particularly adaptable for use in airplanes at high altitudes to indicate the proper flow of oxygen to the pilot or other occupant of the plane.

The gauge is attached in the supply line between the oxygen supply tank and the person wearing the oxygen mask and the point of attachment of the gauge is at a chamber supplied with a mixing valve. In the present state of the art, these mixing valves are of three types and each is made by a different company. One of the types is designed to operate between 3½ lbs. and 4 lbs. pressure; the second to operate between 7 lbs. and 7½ lbs. pressure; and the third to operate either between 0 lb. and ½ lb. or between 0 lb. and 20 lbs. pressure, depending on whether the person takes a small breath or a deep one. In the present gauge, the use of a slipping clutch will eliminate two of these gauges and enable a single blinker gage to perform the functions of all three. Differences in atmospheric pressure are taken care of by allowing a slip in the clutch, but this slip in the clutch in no way will interfere with the proper operation of the blinker shutters.

The gauge is enclosed in a casing and comprises a bellows which expands and contracts due to changes in pressure caused by breathing. The movement of the bellows operates a push rod which passes through a bore in the clutch element. This clutch element has a split extension which is frictionally held to the push rod by means of a spring. The clutch element has a peripheral groove in which there are positioned the ends of short arms of bell crank levers pivoted to a frame mounted in the casing. The longer arms of the bell cranks have shutters attached thereto which are adapted to swing to and from an opening in the face of the gauge. The change in pressure due to breathing by the occupant of the plane causes the bellows to expand and contract to in turn cause the shutters to move back and forth over the opening in the front of the gauge to cause a blinking which will indicate to the occupant of the plane that a supply of oxygen is being properly supplied for efficient breathing.

On the drawings:

Figure 2 is an enlarged detailed view of the clutch and its associated parts, taken at right angles to Figure 1.

Figure 3 is a front elevational view on line 3—3 of Fig. 1 of the gauge with parts broken away better to illustrate the construction.

Figure 6 is a detailed perspective view of the frame for mounting the push rod.

Figure 1:
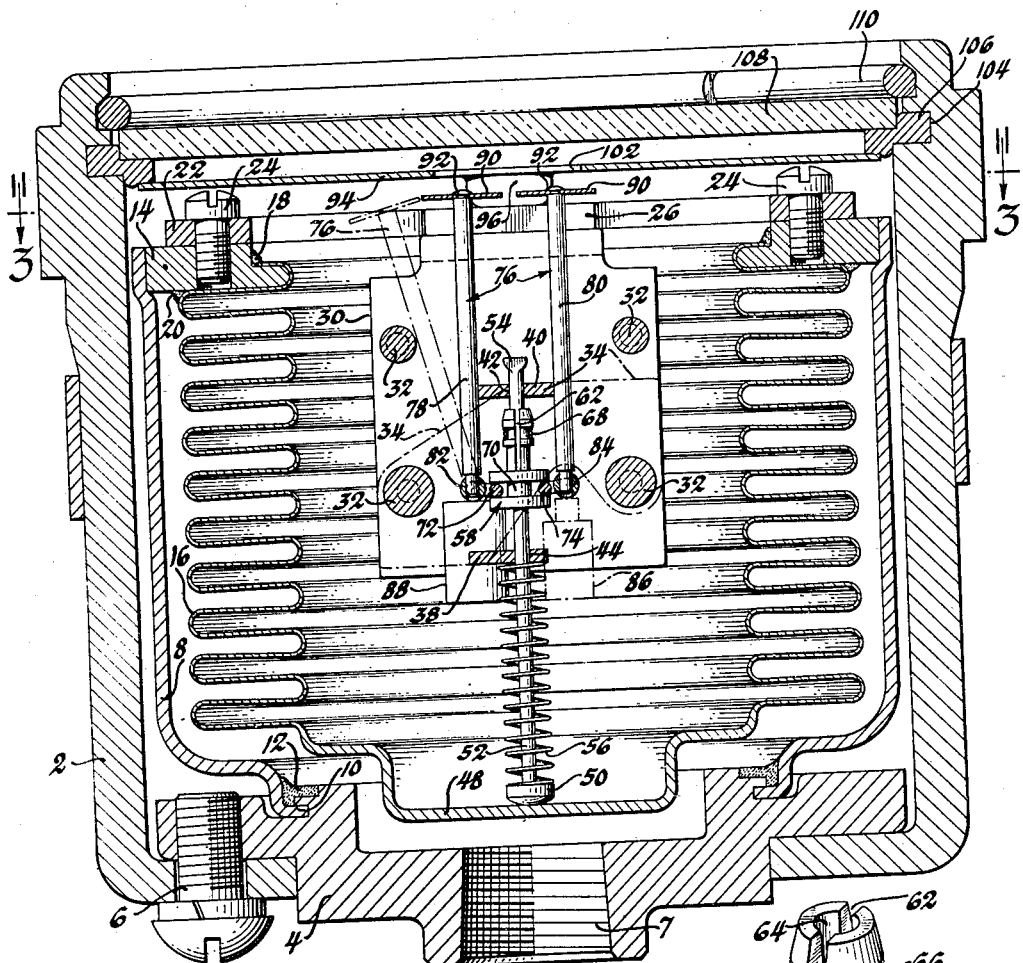
Figure 1 is an enlarged sectional view through the blinker gauge.
Figure 4:
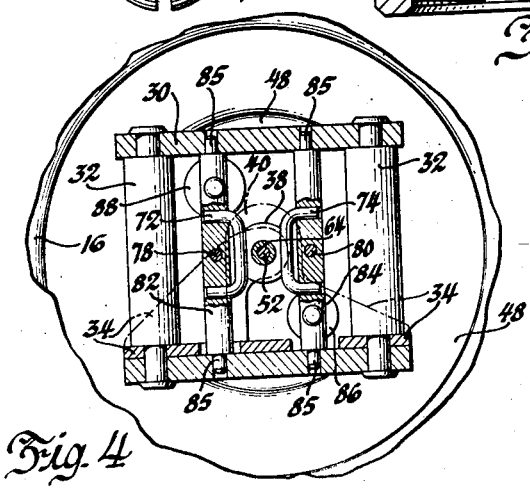
Figure 4 is a section on the line 4—4 of Figure 2.

On the drawings, the numeral 2 indicates the casing for the gauge. A base 4 is rigidly mounted in the casing 2 by means of the bolts 6 and is provided with a threaded opening 7 to enable the attachment of an oxygen feed tube. A supporting body is indicated at 8 and this body is secured as at 10 to the base 4. Solder 12 is also used to make an air tight connection.

At the top of the supporting body 8 a ring 14 is closely and tightly soldered in place in airtight relation and to the ring 14 there is secured in airtight relation one end of a bellows 16. The end fold of the bellows is soldered at 18 and 20 to assure the airtight connection.

Over the ring 14 there is secured by means of the bolts 24 a mounting ring 22 which has two inwardly extending opposed parts 26 to which there is secured by means of rivets 28 the two right-angular frame members 30 which extend inwardly of the gauge or interiorly of the bellows 16. The frame members are united by means of four transverse spacing bars 32.

On the inside wall of the left hand frame member 30 as shown in Figure 2, there is secured a frame 34, shown in perspective in Figure 6. This frame is attached to the frame member 30 by means of suitable fastening members passing through the openings 36. The frame 34 has the inwardly extending ears 38 and 40 provided with aligned openings 42 and 44. The frame 34 is cut away at 46 for a purpose which will later be described.

The bottom of the bellows 16 is thicker and substantially rigid as indicated at 48, and at the central part of this rigid portion 48 there is in contact therewith the head 50 of a push rod 52 which extends upwardly between the frame members 30 and through the openings 42 and 44 of the ears 38 and 40. The free end of the rod 52 is pinched as at 54 to prevent its passing through the openings in the ears 38 and 40. A coil spring 56 surrounds the rod 52 and is under compression between the ear 38 and the head 50 and constantly urges the rod toward and in contact with the thickened end 48 of the bellows.

Figure 5:
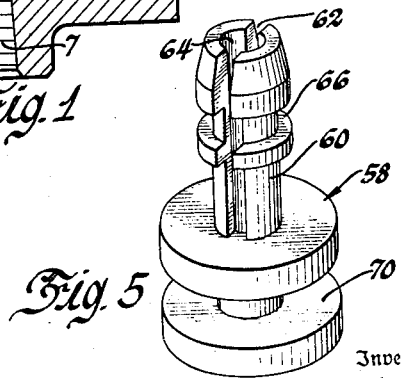
Figure 5 is a detailed perspective view of the clutch element.

Referring to Figure 5, there is shown in enlarged detail a clutch element 58 which has an extension 60 split or provided with a cut-out along its entire length as indicated at 62. Both the extension 60 and the main body of the clutch element 58 are provided with a bore 64 in which the free end of the push rod 52 is received. The extension 60 is provided with a groove 66 in which there is positioned a spring 68 to cause the split extension 60 frictionally to engage the push rod 52. The head of the clutch element 58 is provided with a peripheral groove 70 in which there are received the shorter arms 72 and 74 of bell cranks indicated as a whole at 76. These bell cranks comprise the short arms 72 and 74, the long arms 78 and 80, and the shafts 82 and 84. The shafts 82 and 84 are journaled at 85 in the frame plates 30. The shaft 84 has secured thereto a weight 86 while the shaft 82 has secured thereto a larger weight 88. These weights aid the spring 56 in returning the bell crank arms 76 to the full line position shown in Figure 1.

The ends of the long arms 78 and 80 of the bell crank are provided each with a shutter or blinker 90 secured to the arm end as indicated at 92. Each shutter is preferably semi-oval in shape. The shutters 90 are preferably slightly spaced in their extreme position as shown in Figure 3, but may be in contact if desired.

The instrument is normally positioned on its side with the smaller weight 86 in the upper position. In this position of the instrument, the weight of the longer arm 80 and the shutter 90 is greater than the weight of the weight 86. This will cause the short arm 74 of the bell crank to press against the side of the groove next to the spring 56. The larger weight 88 on the shaft 82, however, is heavier than the arm 78 and shutter 90 and therefore will cause the shorter arm 72 of the bell crank lever to bear against the side of the clutch groove adjacent the spring 56. Both arms 72 and 74 therefore bear on the spring side of the groove 70 which will prevent any fluttering of the gauge and assure accuracy of operation.

Referring to Figure 1, it will be noted that the width of the ear 40 of the frame is calculated to limit the movement of the arms 78 and 80 of the bell cranks to one extreme position as shown. In this position the arms abut against the sides of the ear to hold the blinkers 90 in one extreme position or as shown in the full line position of Figure 1 and in Figure 3, or under the opening 102 in the dial 94. In the opposite direction the maximum movement of the arms 76 is determined by the upper spacing bars 32, or the dotted line position in Figure 1.

Referring to Figures 1 and 6, the cut-out part of the frame 46 is provided in order to enable the larger weight 88 to swing inwardly and outwardly with reference to the frame 34.

A dial 94 is positioned over the mounting ring 22 and is provided with two offset depressions 96 which abut against the mounting ring 22. In these depressions there are received the heads 98 of bolts 100 which pass through openings in the ring 22 and are screwed into threaded openings in the ring 14. This dial 94 is provided with an opening 102 at its middle or immediately over the blinkers 90. The opening 102 is preferably oval. The dial 94 and blinkers 90 are preferably painted with contrasting colors, that is, the blinkers 90 may be white and the dial black so that the eye of the observer will readily note the movement or operation of the blinkers.

The inside edge of the casing is provided with a groove 104 in which there is received a suitable packing ring 106 over which there is received the glass 108 retained in the end of the casing 2 by means of the split ring 110.

The operation of the device is as follows: When the occupant of the plane inhales there will be produced at the side of the mixing valve chamber of one type to which the blinker indicator is attached, an increase in pressure of about one-half pound or more. On other types of mixing valves the pressure drops about one-half pound on inhalation and returns to higher pressure on exhalation. The external surface of the bellows is open to this pressure and the bellows will therefore contract to push the rod 52 upwardly and take therewith the clutch element 58 because of the frictional engagement caused by the split extension 60 and the spring 68. The clutch element 58 will in turn carry therewith the shorter arms 72 and 74 of the bell cranks 76 to cause the shafts 82 and 84 to turn and move the longer arms 78 and 80 which will move the blinkers 90 away from the opening 102 in the dial 94. When the plane occupant exhales, the pressure on the outer side of the bellows will decrease which will cause the bellows to expand. The spring 56 and weights 86 and 88 will now push the rod 52 downward (Figures 1 and 2) and pull therewith the clutch element 58. The movement of the clutch element will cause the bell cranks 76 to reverse their movement and swing the shutters or blinkers 90 underneath the opening 102. The continued breathing of the occupant of the plane will cause an expansion and contraction of the bellows 16 which in turn will cause the blinkers 90 to move away from under the opening 102. The pilot or other occupant of the plane will have the dial of the gauge in front of him and by observing the blinkers 90, he will have a visual indication that his breathing is proper and that he is being supplied with the proper amount of oxygen. If the blinker should not be working, it will be a visual indication to the plane occupant that he is not obtaining a sufficient supply of oxygen and that his breathing is deficient and should be corrected.

As the plane ascends, the atmosphere is more rarified, which will produce a change in pressure. Such change in pressure will not affect the operation of the blinker mechanism for the reason that the rod 52 will be allowed to slip through the clutch element 58 against the tension of the spring 68. This spring is ordinarily strong enough to hold the clutch element 58 on the push rod to enable it accurately and properly to operate the bell cranks, but if for any reason there should be a considerable increase or decrease in atmospheric pressure which affects the bellows 16 to a considerable extent, this excessive change in pressure on the bellows will be compensated by a movement of the push rod in the bore 64 relative to the clutch element 58.

The gauge is designed to operate between 0 lb. and 10 lbs. pressure and approximately a ½ lb. differential in pressure is sufficient to cause the blinkers or shutters to operate. This differential is supplied by ordinary breathing.

I claim:

1. In a blinker gauge, a casing, a pressure responsive bellows mounted in said casing, means to enable the pressure of a gas to be exerted on the bellows to cause the bellows to expand and contract, means movably mounted in the casing and extending into the bellows and in direct contact therewith and responsive to movements thereof, and a blinker mechanism operatively connected to said movable means, said mechanism including oscillating oppositely moving shutters outside the bellows to give a warning signal in response to movements of the bellows.

2. In a blinker gauge, a casing, a pressure responsive bellows mounted in said casing, means to enable the pressure of a gas to be exerted on the bellows to cause the bellows to expand and contract, means movably mounted in the casing and extending into the bellows and in direct contact therewith and responsive to movement thereof, means constantly to urge said second named means toward said bellows to maintain a positive contact therewith, and a blinker mechanism operatively connected to said movable means, said mechanism including oscillating oppositely moving shutters outside the bellows to give a warning signal in response to movements of the bellows.

3. In a blinker gauge, a casing, a pressure responsive bellows mounted in said casing, means to enable the pressure of a gas to be exerted on the bellows to cause the bellows to expand and contract, a frame mounted in the casing and extending into the bellows, a rod movably mounted in the frame inside the bellows and contacting with the bellows and adapted to partake of the movements thereof, means constantly to urge said rod against the bellows to maintain a positive contact, a blinker mechanism operated by the rod, said mechanism including oscillating oppositely moving shutters outside the bellows to give a warning signal in response to movements of the bellows.

4. In a blinker gauge, a casing, a pressure responsive bellows mounted in said casing, means to enable the pressure of a gas to be exerted on the bellows to cause the bellows to expand and contract, a rod contacting with the bellows and adapted to partake of the movements thereof, means in the casing slidably to mount the rod, a clutch element connected to the rod and movable therewith, and a plurality of oscillating shutters operatively connected with the clutch element and movable thereby to give a warning signal in response to movements of the bellows.

5. In a blinker gauge, a casing, a pressure responsive bellows mounted in said casing, means to enable the pressure of a gas to be exerted on the bellows to cause the bellows to expand and contract, a rod contacting with the bellows and adapted to partake of the movements thereof, means in the casing slidably to mount the rod, a clutch element connected to the rod and movable therewith, a frame mounted in the gauge, a plurality of oscillating shutters, means pivoted to the frame and mounting the shutters and operatively connected with the clutch element and movable thereby to cause the shutters to give a warning signal in response to movements of the bellows.

6. In a blinker gauge, a casing, a pressure responsive bellows mounted in said casing, means to enable the pressure of a gas to be exerted on the bellows to cause the bellows to expand and contract, a rod contacting with the bellows and adapted to partake of the movements thereof, means in the casing slidably to mount the rod, a clutch element in the casing and connected to the rod and movable therewith, a plurality of movable bell cranks mounted in the casing and operated by said clutch element and movable thereby, and a plurality of shutters connected to said bell cranks to give a warning signal in response to movements of the bellows.

7. In a blinker gauge, a casing, a pressure responsive bellows mounted in said casing, means to enable the pressure of a gas to be exerted on the bellows to cause the bellows to expand and contract, a rod contacting with the bellows and adapted to partake of the movements thereof, a frame mounted in the casing, said rod being slidably mounted in said frame, a clutch element connected to the rod and movable therewith, a plurality of bell cranks mounted in said frame and operated by said clutch element and movable thereby, and a plurality of shutters connected to said bell cranks to give a warning signal in response to movements of the bellows.

8. In a blinker gauge, a casing, a pressure responsive bellows mounted in said casing, means to enable the pressure of a gas to be exerted on the bellows to cause the bellows to expand and contract, a rod contacting with the bellows and adapted to partake of the movements thereof, means in the casing slidably to mount the rod, a clutch element connected to the rod and movable therewith, said clutch element having a groove, a plurality of bell cranks having one arm extending into the groove and movable with the element, said bell cranks mounted in said second named means, and a plurality of shutters connected to said bell cranks to give a warning signal in response to movements of the bellows.

9. In a blinker gauge, a casing, a pressure responsive bellows mounted in said casing, means to enable the pressure of a gas to be exerted on the bellows to cause the bellows to expand and contract, a rod contacting with the bellows and adapted to partake of the movements thereof, a frame mounted in the casing, said rod being slidably mounted in the frame, a clutch element connected to the rod and movable therewith, said clutch element having a groove, shaft journaled in the frame, a plurality of bell cranks having one arm extending into the groove and movable with the clutch element, said bell cranks being secured to said shafts, a weight secured to each shaft to cause the bell cranks to be urged in one direction and to stabilize the movement of the bell cranks, and a plurality of shutters connected to said bell cranks to give a warning signal in response to movements of the bellows.

10. In a blinker gauge, a casing, a pressure responsive bellows mounted in said casing, means to enable the pressure of a gas to be exerted on the bellows to cause the bellows to expand and contract, a rod contacting with the bellows and adapted to partake of the movements thereof, means in the casing slidably to mount the rod, a clutch element connected to the rod by a slidable frictional connection and movable therewith, and a plurality of oscillating shutters operatively connected with the clutch element and movable thereby to give a warning signal in response to movements of the bellows.

11. In a blinker gauge, a casing, a pressure responsive bellows in said casing, means to enable the pressure of a gas to be exerted on the bellows to cause the bellows to expand and contract, a rod contacting with the bellows and adapted to partake of the movement thereof, a frame mounted in the casing, said frame having arms in which the rod is slidably mounted, a clutch element positioned between said arms and connected to the rod by a slidable frictional connection and movable therewith, and a plurality of oscillating shutters operatively conected with the clutch element and movable thereby to give a warning signal in response to movements of the bellows.

12. In a blinker gauge, a casing, a pressure responsive bellows mounted in said casing, means to enable the pressure of a gas to be exerted on the bellows to cause the bellows to expand and contract, a rod contacting with the bellows and adapted to partake of the movement thereof, means in the casing slidably to mount the rod, a clutch element connected to the rod by a slidable frictional connection and movable therewith, a plurality of movable bell cranks mounted in the casing and operated by said clutch element and movable thereby, and a plurality of shutters connected to said bell cranks to give a warning signal in response to the movements of the bellows.

13. In a blinker gauge, a casing, a pressure responsive bellows mounted in said casing, means to enable the pressure of a gas to be exerted on the bellows to cause the bellows to expand and contract, a rod contacting with the bellows and adapted to partake of the movements thereof, means in the casing slidably to mount the rod, a clutch element connected to the rod by a slidable frictional connection and movable therewith, a plurality of shafts journaled in said second named means, a bell crank mounted in each shaft and operated by said clutch element and movable thereby, and a plurality of shutters connected to said bell cranks to give a warning signal in response to the movements of the bellows.

14. In a blinker gauge, a casing, a pressure responsive bellows mounted in said casing, means to enable the pressure of a gas to be exerted on the bellows to cause the bellows to expand and contract, a rod contacting with the bellows and adapted to partake of the movements thereof, means in the casing slidably to mount the rod, a clutch element connected to the rod by a slidable frictional connection and movable therewith, said clutch element having a groove, a plurality of bell cranks mounted in the casing and having one arm extending into the groove and movable with the element, and a plurality of shutters connected to said bell cranks to give a warning signal in response to movements of the bellows.

15. In a blinker gauge, a casing, a pressure responsive bellows mounted in said casing, means to enable the pressure of a gas to be exerted on the bellows to cause the bellows to expand and contract, a rod contacting with the bellows and adapted to partake of the movements thereof, means in the casing slidably to mount the rod, a clutch element connected to the rod by a slidable frictional connection and movable therewith, said clutch element having a groove, a plurality of shafts journally mounted in said second named means, a bell crank mounted in each shaft and having one arm extending into the groove and movable with the element, and a plurality of shutters connected to said bell cranks to give a warning signal in response to movements of the bellows.

16. In a gauge, a clutch mechanism comprising a shiftable rod, a clutch element, a split extension on said clutch element, said element and said extension having a bore through which the rod passes, a spring surrounding said extension and causing the walls of the extension frictionally to engage the rod to produce a frictional interconnection, said rod normally moving the clutch element due to the frictional engagement but being slidable through the bore against the frictional interconnection.

17. In a gauge, a clutch mechanism comprising a shiftable rod, a clutch element, a split extension on said clutch element, said element and said extension having a bore through which the rod passes, a groove around said extension, a spring in the groove and surrounding said extension and causing the walls of the extension frictionally to engage the rod to produce a frictional interconnection, said rod normally moving the clutch element due to the frictional engagement but being slidable through the bore against the frictional resistance.

18. In a gauge, a clutch mechanism comprising a shiftable rod, a clutch element, a split extension on said clutch element, said element and said extension having a bore through which the rod passes, a spring surrounding said extension and causing the walls of the extension frictionally to engage the rod to produce a frictional interconnection, said rod normally moving the clutch element due to the frictional engagement but being slidable through the bore against the frictional interconnection, said clutch element having a peripheral groove to enable the clutch to engage with a member to be moved.

19. In a gauge, a casing, a bellows in the casing rigidly mounted at one end and free at the other end, means to enable the pressure of a gas to be exerted on the bellows to cause the bellows to expand and contract, a frame rigidly mounted in the casing and extending into the bellows, a plurality of bell crank levers journally mounted in the frame, a shutter element rigidly secured to the end of each bell crank lever outside the bellows, a rod slidably mounted in the frame and being in contact at one end with the free end of the bellows and responsive to movements of the bellows, means constantly urging said rod against the bellows, a clutch mounted on said rod, one of the arms of said bell crank levers being operatively connected with the clutch to partake of the movements of the clutch and the rod, the reciprocation of said rod causing the bell crank levers and the shutter elements to be given a back and forth movement to give a warning signal.

20. In a gauge, a casing, a bellows in the casing rigidly mounted at one end and free at the other end, means to enable the pressure of a gas to be exerted on the bellows to cause the bellows to expand and contract, a frame rigidly mounted in the casing and extending into the bellows, a plurality of bell crank levers journally mounted in the frame, means constantly urging said bell crank levers to one of their extreme positions, a shutter element rigidly secured to the end of each bell crank lever and extending outside the bellows, a rod slidably mounted in the frame and being in contact at one end with the free end of the bellows and responsive to the movements of the bellows, means constantly urging said rod against the bellows, a clutch mounted on said rod, one of the arms of said bell crank levers being operatively connected with the clutch to partake of the movements of the clutch and the rod, the reciprocation of said rod causing the bell crank levers and the shutter elements to be given a back and forth movement to give a warning signal.

CHARLES W. McKINLEY.